US009183385B2

(12) United States Patent
Chapman, II et al.

(10) Patent No.: US 9,183,385 B2
(45) Date of Patent: Nov. 10, 2015

(54) AUTOMATED FEEDBACK FOR PROPOSED SECURITY RULES

(75) Inventors: Daniel E. Chapman, II, Romulus, MI (US); Gary I. Givental, Royal Oak, MI (US); Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 13/591,699

(22) Filed: Aug. 22, 2012

(65) Prior Publication Data
US 2014/0059641 A1  Feb. 27, 2014

(51) Int. Cl.
G06F 21/00 (2013.01)
G06F 21/55 (2013.01)
(52) U.S. Cl.
CPC ...... *G06F 21/554* (2013.01); *G06F 2221/2101* (2013.01)
(58) Field of Classification Search
CPC .................. G06F 21/554; G06F 2221/2101
USPC ............................ 726/1–11, 22–26
See application file for complete search history.

(56) References Cited

U.S. PATENT DOCUMENTS

| 8,209,747 | B2 | 6/2012 | Ottamalika et al. |
| 2003/0061506 | A1* | 3/2003 | Cooper et al. ................. 713/201 |
| 2003/0115322 | A1* | 6/2003 | Moriconi et al. ............. 709/224 |
| 2007/0056036 | A1 | 3/2007 | Focke et al. |
| 2007/0157302 | A1* | 7/2007 | Ottamalika et al. ............ 726/11 |
| 2007/0277222 | A1* | 11/2007 | Pouliot ............................. 726/1 |
| 2008/0265915 | A1* | 10/2008 | Clark et al. ................... 324/699 |
| 2009/0228978 | A1 | 9/2009 | Cooley et al. |
| 2013/0125199 | A1* | 5/2013 | Novak et al. ...................... 726/1 |

* cited by examiner

*Primary Examiner* — Amir Mehrmanesh
(74) *Attorney, Agent, or Firm* — Isaac J. Gooshaw

(57) ABSTRACT

A computer receives entry of a proposed security rule during a security rule entry or editing session and determines that the proposed security rule requires review of a type of security data. The number of matches of the proposed security rule to the logged security data is determined and a user is notified as to the number of matches. The computer searches the security data and applies the proposed security rule to the security data to determine the predicted performance of the proposed security rule. The computer generates a report that may include warnings, recommendations, and information correlated to the security data. The report is presented to a user during the rule editing session, and based on the report a modification to the proposed security rule can be made.

20 Claims, 3 Drawing Sheets

AUTOMATED FEEDBACK FOR PROPOSED SECURITY RULES

FIELD OF INVENTION

The present invention relates generally to Information Technology (IT) security and more particularly to providing feedback during the authoring of IT security rules.

BACKGROUND OF INVENTION

Computer and network systems are subject to attacks such as unauthorized users, viruses, worms, trojans, spyware, targeted attacks, rootkits, bots, phishing, Denial of Service (DOS) and Distributed Denial of Service (DDoS) attacks. To maintain IT security, an understanding of how threats are changing is important. There is an ever-decreasing window of time between the announcement of a new vulnerability and the release of an associated threat capable of exploiting the vulnerability. Undoubtedly, the decreasing window of time is at least partially responsible for the emphasis placed on the need to continuously update the rules and definitions utilized by network-based security countermeasures.

A virus is a program which is able to self replicate and depends upon user interaction for penetration, execution and propagation. A virus also is not self contained and is dependent on a host file or program and host resources such as a host hard drive. A virus will, by definition, make unauthorized changes to a computer and almost always corrupt or modify files on a targeted computer.

A worm is another self replicating program. It is engineered to take advantage of an identified vulnerability to penetrate and execute without user interaction. Unlike a virus, it is self contained and exists in system memory. It uses system and network services to complete transmission and propagation lifecycle stages without reliance on files or programs. A worm often carries a "payload" which is program code in the worm that is designed to do more than spread the worm. For example, it might delete files on a host system, encrypt files, or send documents via e-mail. A common payload for worms is to install a "backdoor", which is a method of securing unauthorized communication, that allows the worm author to access and control the infected computer.

A trojan or trojan horse, is a program that masquerades as a useful or important program. It does not self replicate and will not infect other files. Trojan horses can steal information, and harm their host computer systems. Once a Trojan has been installed on a targeted computer system, an unauthorized user may be given remote access to the computer allowing them to monitor and watch the user's screen, perform operations such as the theft of electronic data including passwords, bank and credit card information, and computer files. A trojan may also track and report internet activity and log the keystrokes of the targeted computer.

Network-based security attempts to stop threats before they gain unwanted access to and/or propagate throughout an organization's computing environment. In general, network-based security countermeasures fall into two classifications: those which are based on a positive model of control, and those which operate with a negative model of control.

Positive-model countermeasures, such as firewalls, operate by identifying communications and then allowing only those communications, programs, and data elements that are known to be good access to the protected computing environment. In general, firewalls filter connections by examining data packets and comparing them to a set of rules for the local process involved in the data transmission. The extent of the filtering is defined by the provided rules. This approach often yields an indiscriminate elimination of unknown as well known threats. Firewalls are most often communications-centric and provide a layer of protection by controlling incoming and outgoing network traffic. Firewalls also have the capability of being able to block material based on file type, as determined by the filename extension. Overall, firewalls have the ability to stop threats when they are being transmitted or are propagating.

Negative-model countermeasures, such as intrusion detection/prevention systems (IDPS) operate by identifying and stopping communications, programs, and activities involving data elements which are known to be bad. The bad data elements are usually associated with a threat to Information Technology (IT) security. IDPS usually incorporate detection techniques which are proactive and reactive mechanisms. Proactive mechanisms include vulnerability based signatures, identification of traffic, and protocol anomalies.

Reactive mechanisms include profile-based (anomaly) intrusion detection, signature-based, and misuse intrusion detection. A false positive occurs when an IDPS reports an event as an intrusion, when the event is a legitimate network activity. A false negative occurs when the IDPS fails to detect actual malicious network activity.

Profile-based intrusion detection detects activity that deviates from statistically common activity. This is commonly known as statistical anomaly-based detection. This method of detection uses a baseline of the network's traffic conditions and average performance. After a baseline is created, the system intermittently samples network traffic, using statistical analysis to compare the sample to the set baseline. If the activity is outside the baseline parameters, the intrusion prevention system takes the appropriate action. The dependence on a statistical definition can make profile based intrusion detection more prone to a large number of false positives.

Signature-based intrusion detection includes pattern matching and detection techniques. Pattern matching looks for a fixed sequence of bytes within a single packet which are associated with a particular service, source or destination port. Signature-based detection is a method of detection which utilizes attack signatures, which are attack patterns that are preconfigured and predetermined. A signature-based intrusion prevention system monitors the network traffic for matches to these signatures. Once a match is found the intrusion prevention system takes the appropriate action. Signatures can be exploit-based or vulnerability-based. Exploit-based signatures analyze patterns appearing in exploits being protected against, while vulnerability-based signatures analyze vulnerabilities in a program, its execution, and conditions needed to exploit said vulnerability. If the matching is based on a pattern that isn't unique enough, a large number of false positives may result.

Misuse detection, in general, detects a pattern of activity which closely matches the activity of a network intrusion. This is often referred to as stateful protocol analysis detection. This method identifies deviations of protocol states by comparing observed events with predetermined profiles of generally accepted definitions of benign activity. A threat is identified by matching the sequence of activities of a malicious individual to a predetermined profile. As with firewalls, the effectiveness of IDPS is heavily reliant on the rules and definitions which form a basis of operation.

Known rule editing software provides access to logs of security events as well as a template in which a security rule may be modified or created. Security logs can be used to track user and system activity and typically can not be altered or modified. An alarm mechanism is often employed for notification purposes, i.e., if there is an accumulation of events that indicate an immanent violation of security policy. Certain security systems and rule editors can associate event log entries with the security rule that triggered the creation of a given event log and be used to assess the accuracy and effectiveness of the security rule.

To remain effective, IT security systems require rules and definitions that allow legitimate user and program activity while preventing or stopping malicious activity. While the foregoing, known rule editor is effective in editing existing security rules or composing new security rules, it does not indicate the viability of an edited or new security rule.

SUMMARY

Embodiments of the present invention provide a system, method, and program product to automatically generate feedback for a proposed security rule during a security rule editing or authoring session. A computer receives entry of a proposed security rule during a security-rule entry or editing session and determines that the proposed security rule requires review of a type of security data. The computer searches for the type of security data in the logs of security data and determines the number of matches. The computer notifies a user as to the number of matches of the proposed security rule to the logged security data.

The computer tests the proposed security rule by applying the proposed security rule to the security data to determine information such as an average and a statistical value that indicate a predicted performance of the proposed security rule. The computer generates a report regarding the security data that includes information such as warnings, recommendations, and information correlated to the security data. Using the information provided in the report and the number of identified matches a user can modify the proposed security rule to exhibit a more desirable performance.

DETAILED DESCRIPTION

Embodiments of the present invention will now be described in detail with reference to the accompanying drawings.

Figure 1:
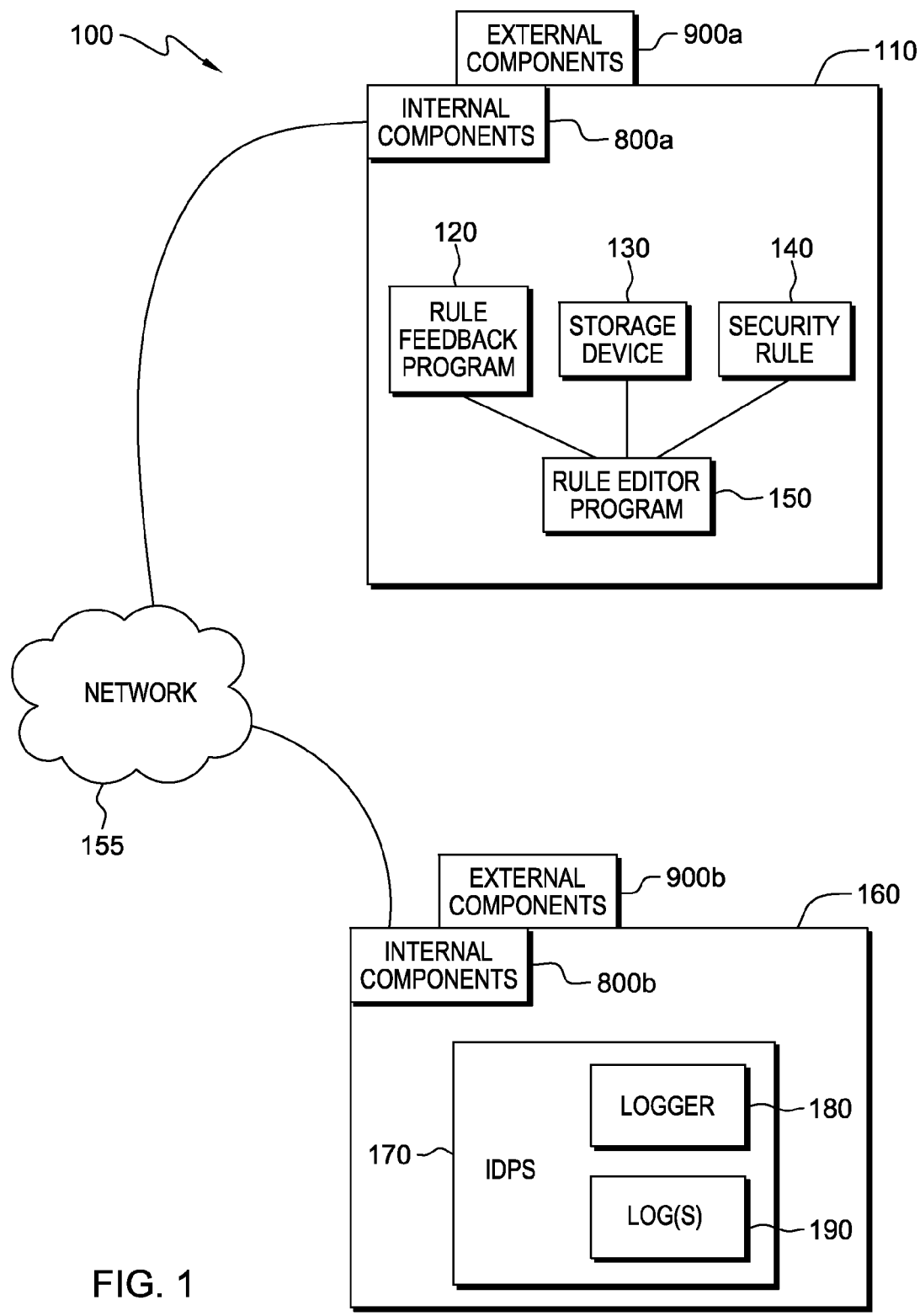
FIG. 1 is a block diagram of security rule feedback system 100 in accordance with an embodiment of the present invention.

FIG. 1 is a block diagram illustrating security rule feedback system 100 in accordance with one embodiment of the present invention. Security rule feedback system 100 includes computer 110, which includes rule editor program 150. Rule editor program 150 has access to rule feedback program 120, storage device 130 and security rule 140. Computer 110 is connected to computer 160 through network 155. Computer 160 includes an intrusion detection/prevention system (IDPS 170). IDPS 170 includes logger 180 and log(s) 190.

In this exemplary embodiment, rule editor program 150, rule feedback program 120, storage device 130 and security rule 140 are located on computer 110. However, in other embodiments, rule feedback program 120, storage device 130 and security rule 140 may be stored externally and accessed through network 155. Network 155 may be, for example, a local area network (LAN), a wide area network (WAN) such as the Internet, or a combination of the two, and may include wired, wireless, fiber optic or any other connection known in the art. In general, network 155 may be any combination of connections and protocols that will support communications between computer 110 and rule editor program 150, rule feedback program 120, storage device 130, security rule 140 and computer 160 in accordance with a desired embodiment of the present invention.

In various embodiments of the present invention, computer 110 and computer 160 may be a server, a laptop computer, a tablet computer, a netbook computer, a personal computer (PC), or a desktop computer. In another embodiment, computer 110 and computer 160 represent computing systems utilizing clustered computers and components to act as a single pool of seamless resources. In general, computer 110 can be any computing device or a combination of devices with access to rule feedback program 120, storage device 130 and security rule 140 and is capable of running rule feedback program 120. In general, computer 160 can be any computing device with access to and is capable of running IDPS 170. Computer 110 and computer 160 may include internal hardware components 800 and external hardware components 900 as depicted and described in further detail with respect to FIG. 3.

In this embodiment, rule editor program 150, is a rule editing/authoring program. Rule editor program 150 includes a number of rule templates for the creation of IDPS security rules as well as a copy of previously created rules which have been or are currently deployed on IDPS 170. The editing/authoring of a rule using rule editor program 150 can be accomplished by a person or a program. Rule editor program 150 has access to rule feedback program 120, storage device 130 and security rule 140.

In this embodiment, rule feedback program 120 is a program that provides real-time feedback and guidance to assist users in writing security rules. Typically, people write the security rules, but security rules can also be written by other programs. As a proposed security rule is written using rule editor 150, rule feedback program 120 determines the results of the proposed security rule by applying the security rule to past and current conditions, to determine if the proposed security rule is practical or satisfies another criteria. For example, if the proposed security rule reports each and every failed login attempt, i.e., where the password is not valid for the user identification (ID), the rule editor will determine from log records how many failed login attempts have occurred in the last predetermined period and report this number to the person or program which proposed the security rule. The person or program can then assess whether the rule is likely over-inclusive, i.e., has flagged so many failed log in attempts that they cannot be manually reviewed. If so, the person or program can either discard the proposed security rule or modify it to identify a lesser number of failed login attempts, such as identifying only two or more failed log in attempts by the same user ID within a few minutes. Alternatively, the person or program can disregard a limited number of failed login attempts by the same user ID within a predetermined period, as this may be indicative of innocent error. As another example, if the proposed security rule identifies messages from a specified IP address that require manual review as potential malware, the rule editor program 150 will determine how many messages arrived from the specified IP address in a predetermined time window (as indicated by a message log), and notifies the person or program which proposed the security rule. The person or program can then assess whether the rule is likely over-inclusive, i.e., has flagged so many messages that they cannot be manually reviewed. If so, the person or program can either discard the proposed security rule or modify it to identify a lesser number of messages, for example, to identify messages from the specified IP address but only those messages using a specified protocol. Conversely, if a proposed security rule does not match any log records in the last month, then perhaps, it is under-inclusive, and needs to be broadened.

In another example, a proposed security rule identifies and reports each and every unauthorized attempt to download and upload files. Rule feedback program 120 will determine from log records how many unauthorized download/upload attempts per client that have occurred in the last predetermined period, and report this information to the person or program which proposed the security rule. The person or program can then assess whether the proposed rule is likely over-inclusive or under-inclusive, i.e., will not flag any or very few log records. It may be beneficial for security rules to be able to account for inadvertent or non-malicious attempts to upload/download files. So, based on the average number of unauthorized attempts per client, the person or program which proposed the security rule can modify the proposed rule to allow for inadvertent or non-malicious attempts to upload/download files.

In a further example, a proposed security rule that identifies and reports malicious email messaging activity which includes a large number of email recipients. A large number of recipients may be indicative of "spam" mailing of messages. Rule feedback program 120 searches the log records and reports the number of average recipients per email and reports this information to the person or program which proposed the security rule. The person or program can then assess whether the rule is likely over-inclusive, i.e., has flagged so many messages that they cannot practically be manually reviewed. If so, the person or program can either discard the proposed security rule or modify it to identify a lesser number of messages, for example, to identify and create an exception for a message from corporate headquarters that is being sent to every employee of a company.

In a yet further example, a proposed security rule identifies and reports the identity of a computer within a network 155 that is associated with the transmission of virus infected files. Rule feedback 120 searches the log records and reports the number of computers transmitting files with computer viruses. A computer which is transmitting large numbers of infected files may present a threat to the security of an entire computer network 155. A large number of transmitted infected files with viruses can indicate that the virus protection of that computer has failed or is in need of updating. Rule feedback program 120 uses the information identified by the search to generate an analysis of the proposed security rule. Based on the returned search results and analysis the person or program can then assess whether the rule is likely over-inclusive or under-inclusive. A finished rule is stored in security rule 140 and may then be sent to computer 160 and activated for use by IDPS 170.

In this embodiment, storage device 130 is a data storage device which contains a copy of the security data and/or logs generated by logger 180 executing on computer 160. Computer 160 has an intrusion detection and prevention system (IDPS). The IDPS utilizes signature-based detection, statistical anomaly-based detection, and stateful protocol analysis detection. IDPS 170 can be any system or device that utilizes a security policy. For example, IDPS 170 can be a Firewall, an Anti-Spam system, or a Security Information and Event Management (SIEM) system. The security data/logs are records of the activity on the computer 160. In some examples, the security data/logs include the IP address of the client, the requests of the client, the date/time of a given request, the sockets used, the hypertext transfer protocol (HTTP) code, number of bytes served, the user's software agent, and the HTTP "referer".

In this embodiment, storage device 130 is the storage location for security rules as they are written, after they have been finalized, and after the rule has been enabled for deployment on IDPS 170. Computer 160 has access to security rule 140 through computer 110. After a new security rule has been finalized, computer 110 pushes the security rule to computer 160 for storage at and usage during actual log processing by IDPS 170. Security rule 140 is used by computer 160 for the operation of IDPS 170. In other embodiments security rule 140 are located on computer 160.

In this embodiment, during the execution of IDPS 170 on computer 160, system activity information is logged in an ongoing basis. Logger 180 creates security logs of all authorized and unauthorized activity such as violations of pre-existing rules or the sending of an authorized email. For example, data for predetermined types of problems, such as failed log in attempts is logged. In a further example, all source IDs of messages are logged and those that fail some pre-existing rule, such as a rule detecting malware or spam, are flagged and logged as such. The created logs are stored in log(s) 190 and a copy of the security data and/or logs is sent to computer 110 and stored in storage device 130. Rule feedback program 120 uses the copy of the security data and/or logs, stored in storage device 130, during the automatic generation of feedback for a proposed security rule.

Figure 2:
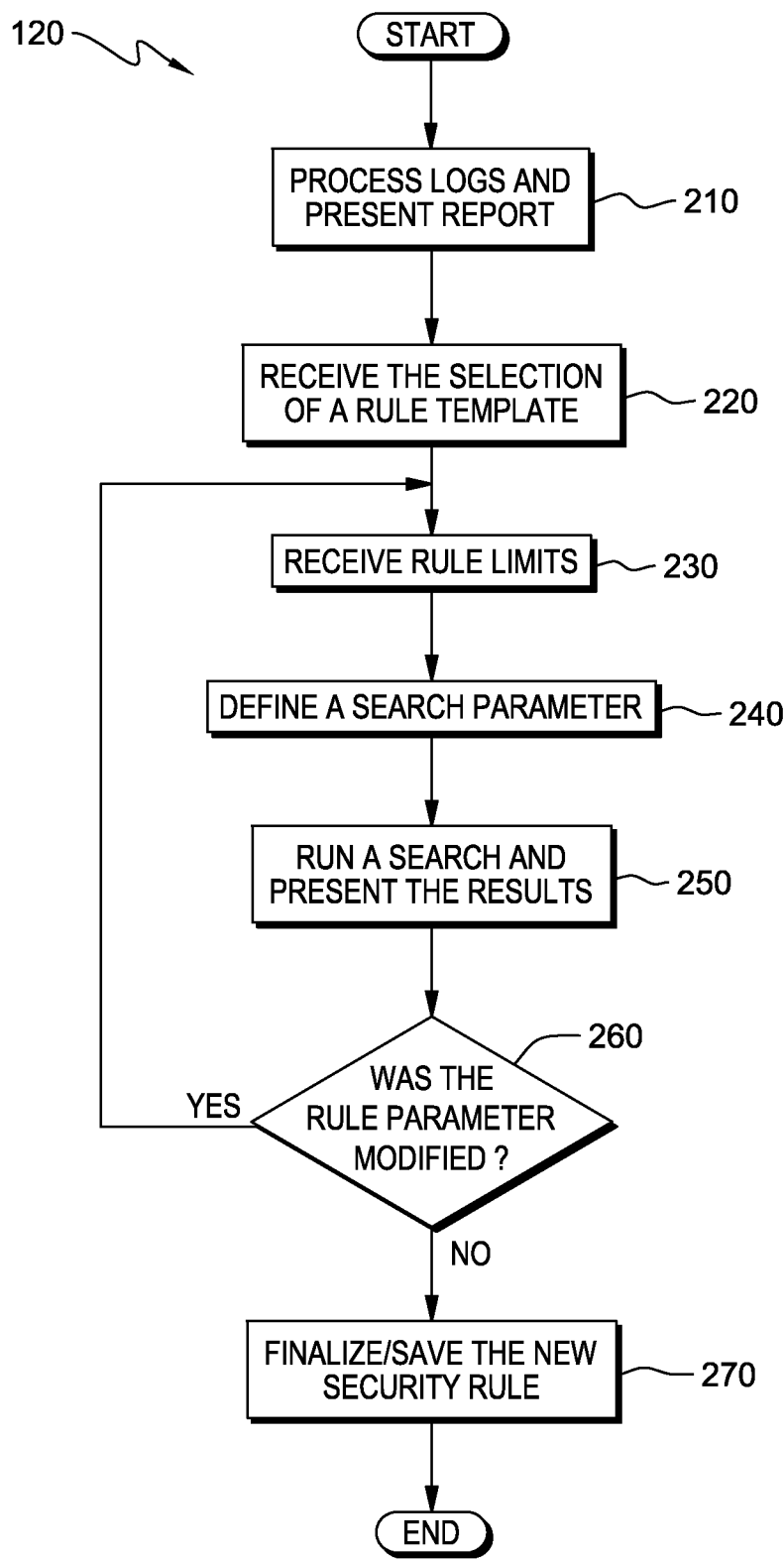
FIG. 2 is a flowchart illustrating the steps of a rule editor of FIG. 1 in accordance with an embodiment of the present invention.

FIG. 2 is a flowchart illustrating the function of rule feedback program 120, executing on computer 110, for the generation of real-time feedback during the authoring of a security rule 140 in an exemplary embodiment.

In this exemplary embodiment, in step 210, rule feedback program 120 processes the security data and/or logs located on storage device 130. The processing includes a sorting/categorizing and a statistical analysis of the security data and/or logs. The statistical analysis can be used as a frame of reference when examining the activity of currently executing security rules. The statistical analysis may provide motivation for the authoring of a new security rule or for the modification an existing rule. For example, a statistical analysis may indicate how many log records in a predetermined period matched the security rule 140 where the security rule 140 flagged an event, and how many entities were the cause of the security rule 140 violation. The result of the processed security data is presented in the form of a report to the rule author and/or to a user. For example, a user, who happens to be a manager, may use the report presented by rule feedback program 120 to help determine if existing IDPS security rules require an update, for example, because they are impractical (over-inclusive) or ineffective (under-inclusive) based on the number of matches in the log records. After determining that the existing rules are in need of an update, the manager sends out a work order to the rule author to update the security rule 140. Based on the report, the rule author may determine that a modification to the existing rule is insufficient and that a new security rule is required. For example, the sorted/categorized information shows that a high number of failed login attempts (for example, more than a predetermined threshold) were made in the last twenty four hours, more than can be manually investigated. The statistical analysis portion of the report, indicates that the large percentage of the failed login attempts were primarily due to a small number of clients, which is indicative of misuse. The rule author decides, based on the report, that there are too many failed login attempts being made by the same client. As a result, the rule author may initiate a rule editing/authoring session. In other embodiments, the presentation of the report to the user or rule author may also include warnings and recommendations, which may prompt for the creation or modification of a security rule 140.

In step 220, rule feedback program 120 detects the initiation of a security rule editing/authoring session using rule editor program 150. The rule author selects a security rule template from a list of available templates indexed by type of security rule 140 they generate. The selection of an appropriate template may be influenced by the information presented in step 210. For example, the information presented in step 210 indicated that a proposed security rule 140 regarding login attempts is desired to maintain the security of the computer 160. So, as a result, an appropriate login template is selected. In another example, the information presented did not indicate the immediate need for a proposed security rule 140. However, a bi-annual security system update was desired and all the security rules were scheduled for an update. The security rule 140 to be updated is selected from a list of existing security rules and a rule editing session is initiated.

In this embodiment in step 230, rule feedback program 120 receives from the user using the appropriate template parameters for a proposed security rule 140. For example, the parameters may be numerical values such as a number of failed login attempts by the same user ID and/or time constraints or repeated login failures by the same client. For example, a pre-existing rule may require an update to the number of failed login attempts which are allowed before the client is locked out from their account. In another example, a time constraint is added to a security rule 140 such that the failed login attempts must occur within a five minute period for the client to be locked out from their account. Optionally, the user can also enter into the template an acceptable number/limit of "hits" of the proposed security rule 140 over a specified period. This number does not define the security rule 140 itself or the events that it flags; rather, the rule editor program 150 uses the number during the feedback process to advise the user how many sources of the events will exceed the limit.

In step 240, rule feedback program 120 defines search parameters based on the content of the proposed security rule 140. The search parameters are defined as the security rule 140 is created or modified. The parameters of the search are based on the content of the security rule 140. The pool of logs to be searched is defined by the type of security data which correlates to the search parameters and any additional constraints, such as logs which occurred over the previous week. For example, a proposed security rule 140 includes limits for failed login attempts with an associated numerical value and a time constraint. The resulting search parameters would include failed logins, the number of failed login attempts per client, and the time period over which the failed login attempts occurred. The search may be further limited by constricting the pool of logs to be searched. For example, the search may only include logs which occurred over the previous twenty four hours.

In this embodiment, rule feedback program 120 performs a search, in step 250, of the logs stored in storage device 130 using the search parameters defined in step 240. The rule feedback program 120 analyzes the search results and categorizes and/or groups them according to the respective parameters which identified a given search result. For example, a search parameter may define a search for logs relating to failed login attempts. The rule feedback program 120 categorizes the returned search results according to the number of failed login attempts per given user ID, the time period over which the failed login attempts occurred, and by the number of user IDs which fall into those categories. Rule feedback program 120 tests the proposed security rule 140 against the security data/logs identified in the search to determine how many log records match the proposed security rule 140. In other words, the rule feedback program 120 determines how many events would have been flagged by the proposed security rule 140 if the proposed security rule 140 was in effect during the time window in which the log records were analyzed. The rule feedback program 120 then presents the results of the log analysis to the rule author, while the security rule 140 is being created or modified. The presented rule analysis may include a message with warnings (such as "too many hits") and/or recommendations (such as "narrow the proposed security rule"), search results, statistics, data treatments, and information correlated to the rule analysis of the proposed security rule 140.

In this embodiment, the purpose of an analysis is to provide the rule author with real-time feedback as to the effectiveness of a proposed security rule 140 as it is authored. For example, the analyzed results include the total number of failed login attempts during the last twenty four hours and a grouping which shows the number and/or percentage of clients associated with a given number of failed logins. The analysis also results in a warning message being shown to the rule author that indicates that the number of failed login attempts associated with two clients match a pattern used to identify potential misuse. A recommendation message is also displayed which indicates that the number of allowable failed logins is too high and should be lowered. Based on the analysis and messages the rule author may choose to revise the number of allowable failed logins.

In a further example, the rule author has accidentally entered in the allowable number/limit of failed logins as forty five instead of five. The rule analysis would indicate that a very small percentage of clients would exceed that limit and a message would be displayed indicating that the limit overlaps the pattern used to identify misuse. Guided by the results the rule author may choose to enter a modification to the proposed security rule 140. In certain embodiments, the search results are presented, along with the analysis, to the rule author and may be examined in detail if desired.

In this embodiment, in step 260, rule feedback program 120 determines if the rule author has entered a modification of the rule limits and/or criteria. If the rule was modified, then rule feedback program 120 returns to step 230 and enters the new rule limits into the appropriate field. Rule editor program 120 continues repeating steps 230 through 260 until the rule author no longer modifies the limits and/or criteria of the proposed security rule 140. If rule feedback program 120 determines that no modifications have been entered by the rule author, then rule feedback program 120 proceeds to step 270.

In this embodiment, in step 270, rule feedback program 120 finalizes the new rule and saves it to security rule 140. The new security rule may be accessed by computer 160, enabled and begin to function as a security rule for IDPS 170.

Figure 3:
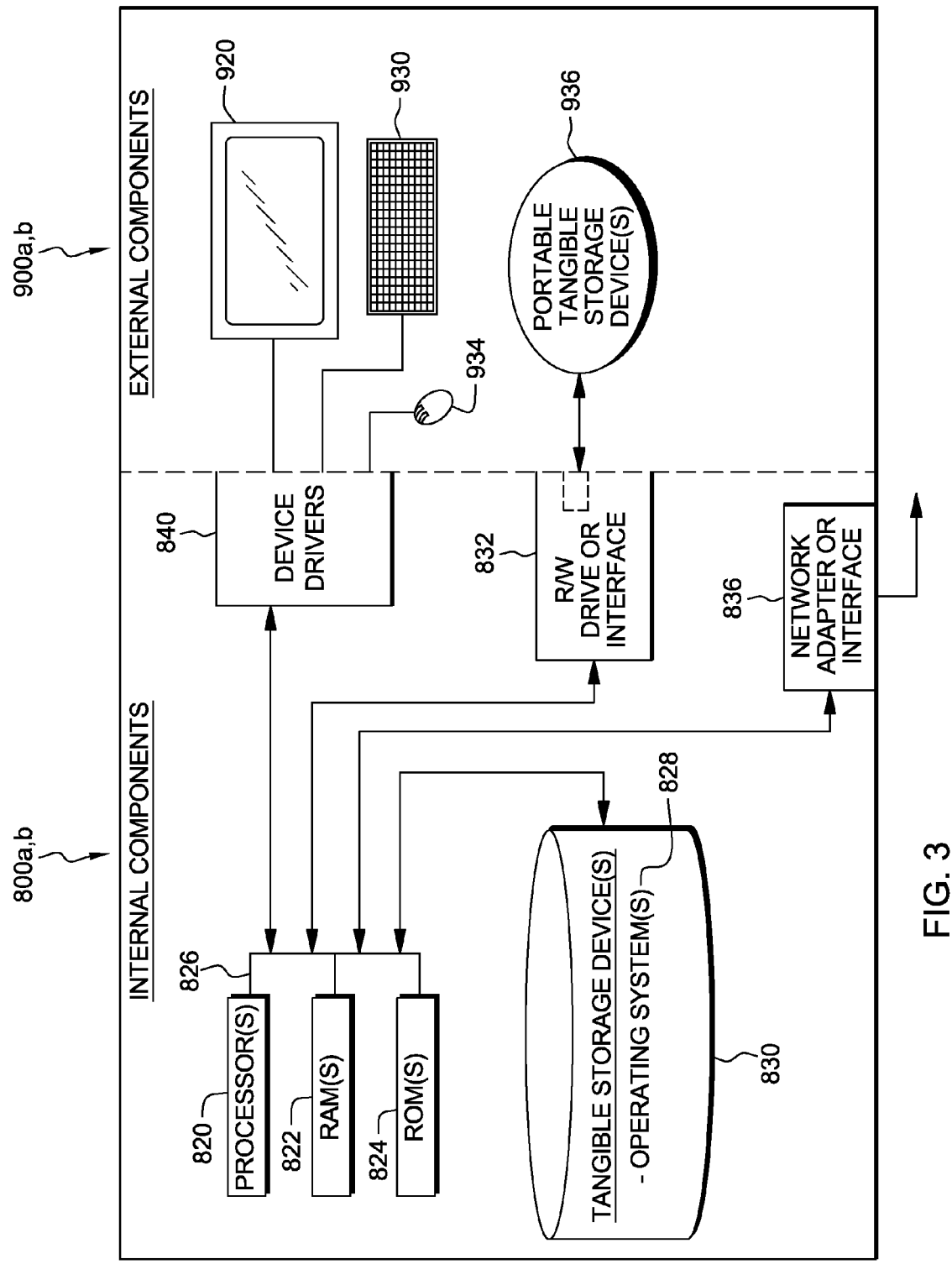
FIG. 3 is a block diagram of internal and external components within the computing devices of FIG. 1 in accordance with an embodiment of the present invention.

Computer 110 and computer 160 include respective sets of internal components 800a,b and external components 900a,b illustrated in FIG. 3. Each of the sets of internal components 800a,b includes one or more processors 820, one or more computer-readable RAMs 822 and one or more computer-readable ROMs 824 on one or more buses 826, one or more operating systems 828 and one or more computer-readable tangible storage devices 830. The one or more operating systems 828 and programs rule editor software 120, storage device 130 and security rule 140 for computer 110 and IDPS 170 logger, 180 and log(s) 190 for computer 160 are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs rule feedback program 120, storage device 130 and security rule 140 for computer 110 and IDPS 170, logger 180 and log(s) 190 for computer 160, can be stored on one or more of the respective portable computer-readable tangible storage devices 936, read via the respective R/W drive or interface 832 and loaded into the respective hard drive or semiconductor storage device 830.

Each set of internal components 800a,b also includes a network adapter or interface 836 such as a TCP/IP adapter card or wireless communication adapter (such as a 4G wireless communication adapter using OFDMA technology). The programs rule feedback program 120, storage device 130 and security rule 140 for computer 110 and IDPS 170, logger 180 and log(s) 190 for computer 160 can be downloaded to the respective computing/processing devices from an external computer or external storage device via a network 155 (for example, the Internet, a local area network or other, wide area network or wireless network) and network adapter or interface 836. From the network adapter or interface 836, the programs are loaded into the respective hard drive or computer-readable tangible storage device 830. The network 155 may comprise copper wires, optical fibers, wireless transmission, routers, firewalls, switches, gateway computers and/or edge servers.

Each of the sets of external components 900a,b include a display screen 920, a keyboard or keypad 930, and a computer mouse or touchpad 934. Each of the sets of internal components 800a,b also includes device drivers 840 to interface to display screen 920 for imaging, to keyboard or keypad 930, to computer mouse or touchpad 934, and/or to display screen for pressure sensing of alphanumeric character entry and user selections. The device drivers 840, R/W drive or interface 832 and network adapter or interface 836 comprise hardware and software (stored in computer-readable tangible storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

Based on the foregoing, a computer system, method and program product have been disclosed for generating a security rule. However, numerous modifications and substitutions can be made without deviating from the scope of the present invention. Therefore, the present invention has been disclosed by way of example and not limitation.

What is claimed is:

1. A method for providing feedback on a proposed security rule, the method comprising the steps of:
   receiving, by a computer, entry of a proposed security rule during a security-rule creation session;
   during the proposed security-rule creation session, testing, by the computer, the proposed security-rule by applying the proposed security rule to historical logged event data;
   determining, by the computer, a number of matches returned by the proposed security rule that result from application of the proposed security-rule to the historical logged event data, wherein the number of matches indicate a predicted performance of the proposed security rule as part of a network security system;
   notifying, by the computer, a user as to the number of matches during the security-rule creation session; and
   sending, by the computer, a message to the user during the proposed security-rule creation session, wherein the message includes a recommended change for one or more portions of the proposed security based, at least in part, on the number of matches and a threshold number of matches.

2. The method of claim 1 wherein the proposed security rule controls access to protected computer systems, programs or databases.

3. The method of claim 1 wherein the proposed security rule detects at least one of malicious messages, malicious computer access, attempted malicious activity relating to program access, attempted malicious activity relating to computer access, unauthorized download or upload of data.

4. The method of claim 1, wherein the step of testing the proposed security rule further comprises:
   a computer determining that the proposed security rule requires review of a type of security data;
   the computer searching the security data of the type;
   applying the proposed security rule to the security data to determine one or more of an average, and a statistical value that indicates a predicted performance of the proposed security rule; and
   the computer, generating a report regarding the security data, wherein the report includes at least one of warnings, recommendations, and information correlated to the security data.

5. The method of claim 1, further comprising the step of:
   the computer sending a message to a user during a rule editing session, wherein the message includes one or more of warnings, search results, and information correlated to an analysis of security data.

6. The method of claim 1, further comprising the step of:
   the computer receiving a modification to the proposed security rule.

7. The method of claim 1, further comprising the steps of:
   determining, by the computer, a difference between the number of matches and the threshold;
   determining, by the computer, a recommended change for at least one parameter of the proposed security rule, wherein executing the change to the security rule alters the difference between the number of matches and the threshold number of matches such that the number of matches returned by the proposed security rule is within a range of matches that can be investigated; and
   presenting, by the computer, a notification that includes the recommended change to the user during the security-rule creation session, wherein the notification indicates the difference between the number of matches and the threshold number of matches.

8. The method of claim 1, further comprising the steps of:
determining, by the computer, whether the proposed security rule either over-inclusive or under-inclusive based, at least in part, on the number of matches and the threshold number of matches;
responsive to a determination that the proposed security rule is either over-inclusive or under-inclusive, determining, by the computer, a recommended change for at least one parameter of the proposed security rule, wherein executing the change to the security rule alters the proposed security rule such that the number of matches returned by the proposed security rule is within a range of matches that can be investigated; and
presenting, by the computer, a notification that includes the recommended change to the user during the security-rule creation session, wherein the notification indicates whether the proposed security rule either over-inclusive or under-inclusive.

9. A computer system to generate automated feedback for proposed security rules, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive entry of a proposed security-rule during a security-rule creation session;
program instructions to test, during the security-rule creation session, by applying the proposed security rule to historical logged event data;
program instructions to determine a number of matches returned by the proposed security rule that result from application of the proposed security-rule to the historical logged event data, wherein the number of matches indicate a predicted performance of the proposed security rule as part of a network security system; and
program instructions to notify a user as to the number of matches during the security-rule creation session; and
program instructions to send a message to the user during the proposed security-rule creation session, wherein the message includes a recommended change for one or more portions of the proposed security based, at least in part, on the number of matches and a threshold number of matches.

10. A computer system in accordance with claim 9 wherein the proposed security rule controls access to protected computer systems, programs or databases.

11. A computer system in accordance with claim 9 wherein the proposed security rule detects at least one of malicious messages, malicious computer access, attempted malicious activity relating to program access, attempted malicious activity relating to computer access, unauthorized download or upload of data.

12. A computer system in accordance with claim 9, further comprising program instructions to:
determine that the proposed security rule requires review of a type of security data;
search the security data of the type;
apply the proposed security rule to the security data to determine one or more of an average, and a statistical value that indicates a predicted performance of the proposed security rule; and
generate a report regarding the security data, wherein the report includes at least one of warnings, recommendations, and information correlated to the security data.

13. A computer system in accordance with claim 9, further comprising program instructions to send a message to a user during a rule editing session, wherein the message includes one or more of warnings, search results, and information correlated to an analysis of security data.

14. A computer system in accordance with claim 9, further comprising program instructions to receive a modification to the proposed security rule.

15. A computer program product to generate automated feedback for proposed security rules, the computer program product comprising:
one or more computer-readable storage devices and program instructions stored on at least one of the one or more tangible storage devices, the program instructions comprising:
program instructions to receive entry of a proposed security-rule during a security-rule creation session;
program instructions to test, during the security-rule creation session, by applying the proposed security rule to historical logged event data;
program instructions to determine a number of matches returned by the proposed security rule that result from application of the proposed security-rule to the historical logged event data, wherein the number of matches indicate a predicted performance of the proposed security rule as part of a network security system; and
program instructions to notify a user as to the number of matches during the security-rule creation session; and
program instructions to send a message to the user during the proposed security-rule creation session, wherein the message includes a recommended change for one or more portions of the proposed security based, at least in part, on the number of matches and a threshold number of matches.

16. The computer program product of claim 15 wherein the proposed security rule controls access to protected computer systems, programs or databases.

17. The computer program product of claim 15 wherein the proposed security rule detects at least one of malicious messages, malicious computer access, attempted malicious activity relating to program access, attempted malicious activity relating to computer access, unauthorized download or upload of data.

18. The computer program product of claim 15, further comprising program instructions to:
determine that the proposed security rule requires review of a type of security data;
search the security data of the type;
apply the proposed security rule to the security data to determine one or more of an average, and a statistical value that indicates a predicted performance of the proposed security rule; and
generate a report regarding the security data, wherein the report includes at least one of warnings, recommendations, and information correlated to the security data.

19. The computer program product of claim 15, further comprising program instructions to send a message to a user during a rule editing session, wherein the message includes one or more of warnings, search results, and information correlated to an analysis of security data.

20. The computer program product of claim 15, further comprising program instructions to receive a modification to the proposed security rule.

\* \* \* \* \*